(12) United States Patent
Hecht

(10) Patent No.: US 8,821,079 B2
(45) Date of Patent: Sep. 2, 2014

(54) CUTTING TOOL AND CUTTING INSERT THEREFOR

(75) Inventor: Gil Hecht, Nahariya (IL)

(73) Assignee: Iscar, Ltd., Tefen (IL)

(*) Notice: Subject to any disclaimer, the term of this patent is extended or adjusted under 35 U.S.C. 154(b) by 310 days.

(21) Appl. No.: 13/413,387

(22) Filed: Mar. 6, 2012

(65) Prior Publication Data

US 2013/0236255 A1  Sep. 12, 2013

(51) Int. Cl.
*B23P 15/28* (2006.01)
*B26D 1/00* (2006.01)

(52) U.S. Cl.
USPC ............................. 407/113; 407/114

(58) Field of Classification Search
CPC ............ B23B 27/1611; B23B 2205/16; B23B 2205/12; B23B 2200/165; B23B 2200/161
USPC ............................ 407/103, 113, 114, 115, 116
See application file for complete search history.

(56) References Cited

U.S. PATENT DOCUMENTS

| | | | |
|---|---|---|---|
| 6,921,234 B2 * | 7/2005 | Arvidsson et al. | 407/103 |
| 7,201,545 B2 | 4/2007 | Ejderklint | |
| 7,387,474 B2 * | 6/2008 | Edler et al. | 407/113 |
| 7,578,641 B2 * | 8/2009 | Andersson et al. | 407/113 |
| 8,313,270 B2 * | 11/2012 | Hecht | 407/113 |
| 8,529,167 B2 * | 9/2013 | Shaheen | 407/113 |

FOREIGN PATENT DOCUMENTS

JP  2000-071110 A  3/2000

OTHER PUBLICATIONS

Search Report dated May 24, 2013 issued in PCT counterpart application (PCT/IL2013/050118), Mar. 9, 2014.

* cited by examiner

*Primary Examiner* — Will Fridie, Jr.
(74) *Attorney, Agent, or Firm* — Womble Carlyle

(57) ABSTRACT

An indexable cutting insert has opposing rhombus-shaped upper and lower surfaces and a peripheral side surface therebetween with alternating obtuse and acute corner surfaces. A nose cutting edge is formed at the intersection of the upper surface with each of the two acute corner surfaces. The lower surface includes a base surface from which a central boss and exactly two engagement ridges protrude. Each engagement ridge extends from the central boss to intersect with its respective acute corner surface, and the base surface is divided into two base sub-surfaces. The insert may be clamped against a seating surface of a tool holder pocket solely by the engagement ridge located closest to the operative nose cutting edge making contact with a corresponding single engagement groove, and the two base sub-surfaces making contact with two coplanar raised support surfaces.

26 Claims, 6 Drawing Sheets

CUTTING TOOL AND CUTTING INSERT THEREFOR

FIELD OF THE INVENTION

The present invention relates to a cutting tool and a cutting insert for use in metal cutting processes in general, and for turning operations in particular.

BACKGROUND OF THE INVENTION

Within the field of cutting tools used in turning operations, there are many examples of cutting inserts being removably secured in an insert receiving pocket of a tool holder. In some instances, these cutting tools are configured such that the co-operating surfaces of the cutting insert and the insert receiving pocket are formed with protrusions and recesses. In other instances, these cutting tools are configured such that the co-operating surfaces of the cutting insert and the insert receiving pocket are formed with male and female type mating elements.

U.S. Pat. No. 7,201,545 discloses a cutting tool having a holder, a shim and an indexable cutting insert. The shim, having a substantially rhomboidal shape with substantially parallel upper and lower sides, is mounted in a pocket of the holder. The cutting insert, having a substantially rhomboidal shape, in analogy with the shim, is mounted against the shim, whereby three out of six protrusions on a lower side of the cutting insert are in 'active' abutment with two support surfaces on the upper side of the shim, whilst two recesses on the upper side of the shim provide clearance for the other three 'passive' protrusions. Indexing the cutting insert by 180° results in the three 'active' protrusions becoming 'passive' and vice versa.

U.S. Pat. No. 7,387,474 discloses a cutting tool having a holder with an insert seat, and an indexable cutting insert, with a rhombic basic shape, mounted therein. The insert seat includes two male type engagement portions in the form of elongated ridges oriented at a 90° to each other, and forming a T-shaped configuration. A bottom side of the cutting insert includes two sets of female type engagement portions, each set having two elongated grooves oriented at 90° to each other. In each index position of the cutting insert, one set is actively engaged with the two elongated ridges and the other set is inactive.

SUMMARY OF THE INVENTION

In accordance with the present invention, there is provided a single-sided indexable cutting insert comprising:

opposing rhombus-shaped upper and lower surfaces and a peripheral side surface therebetween, the peripheral side surface having alternating obtuse and acute corner surfaces separated by four relief surfaces;

a central axis passing through the upper and lower surfaces, about which central axis the cutting insert is indexable; and a nose cutting edge formed at the intersection of the upper surface with each of the two acute corner surfaces, the lower surface comprising:

a base surface; and a central boss and exactly two engagement ridges protruding from the base surface, the central boss having a raised boss end surface, and each engagement ridge including a pair of parallelly extending ridge flank surfaces forming a V-shaped cross-section, wherein each engagement ridge intersects one of the acute corner surface and extends therefrom towards the central axis to intersect the central boss, and the base surface is divided into at least two separate base sub-surfaces.

Also in accordance with the present invention, there is provided a tool holder comprising:

a main body with an insert receiving pocket at a front end thereof, the insert receiving pocket including a seating surface, and the seating surface having a floor surface with a single engagement groove recessed therein and exactly two separate support steps protruding therefrom, the engagement groove including a pair of parallelly extending groove flank surfaces forming a V-shaped cross-section; and each of the two support steps having a raised support surface, wherein the two support surfaces are coplanar and entirely located rearward of the engagement groove.

Further in accordance with the present invention, there is provided a cutting tool comprising:

a tool holder having a main body with an insert receiving pocket formed in a front end thereof, and a cutting insert removably secured in the insert receiving pocket;

the insert receiving pocket comprising:

a seating surface having a floor surface with a single engagement groove recessed therein and two separate support steps protruding therefrom;

the engagement groove including a pair of parallelly extending groove flank surfaces forming a V-shaped cross-section, and each of the two support steps having a raised support surface, wherein the two support surfaces are coplanar, and a cutting insert comprising:

opposing rhombus-shaped upper and lower surfaces and a peripheral side surface therebetween, the peripheral side surface having alternating obtuse and acute corner surfaces separated by four relief surfaces;

a central axis passing through the upper and lower surfaces, about which central axis the cutting insert is indexable; and a nose cutting edge formed at the intersection of the upper surface with each of the two acute corner surfaces, the lower surface including a base surface and having exactly two engagement ridges protruding from the base surface, wherein each engagement ridge includes a pair of parallelly extending ridge flank surfaces forming a V-shaped cross-section, and each engagement ridge intersects one of the acute corner surface and extends therefrom towards the central axis, wherein the lower surface of the cutting insert is clamped against the seating surface of the insert receiving pocket solely by:

the pair of ridge flank surfaces of the engagement ridge located closest to the operative nose cutting edge making contact with the corresponding pair of groove flank surfaces in the single engagement groove; and the base surface making contact with the two raised support surfaces at two bearing zones entirely located closer to the non-operative nose cutting edge than to the operative nose cutting edge.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
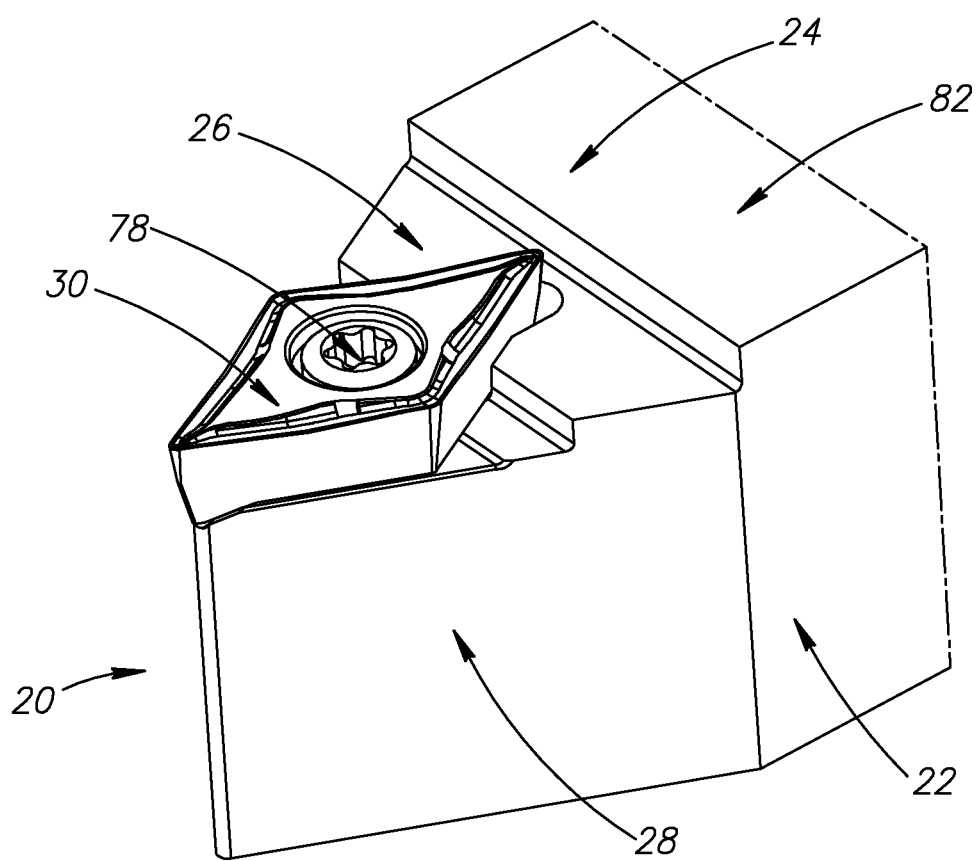
FIG. 1 is a perspective view of a cutting tool in accordance with some embodiments of the present invention.

The present invention relates to a cutting tool 20 comprising a tool holder 22 having a main body 24 with an insert receiving pocket 26 formed in a front end 28 thereof, and a single-sided indexable cutting insert 30 removably secured in the insert receiving pocket 26.

Figure 2:
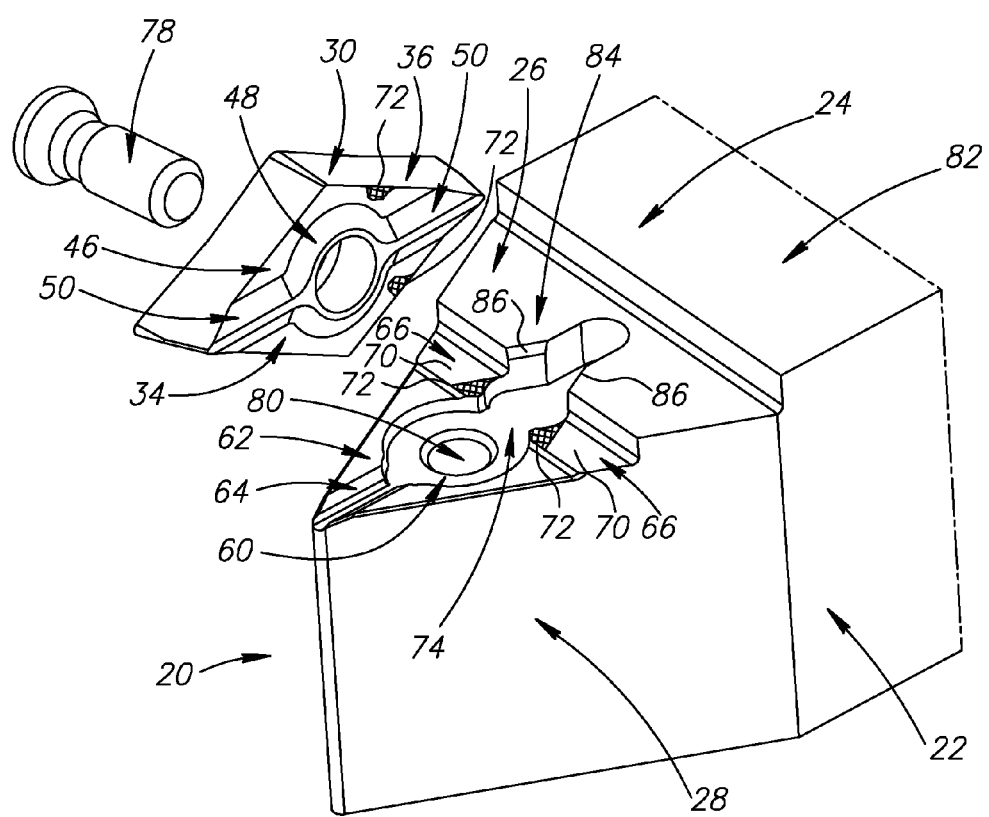
FIG. 2 is an exploded perspective view of the cutting tool shown in FIG. 1.

In some embodiments of the present invention, as shown in FIGS. 1 and 2, the cutting tool 20 may be in the form of a turning tool, having a holder shank 82 extending away from the front end 28 of the main body 24.

Also, in some embodiments of the present invention, the tool holder 22 may be manufactured from machined steel, and the cutting insert 30 may preferably be manufactured by form pressing and sintering a cemented carbide, such as tungsten carbide, and may be coated or uncoated.

Figure 3:
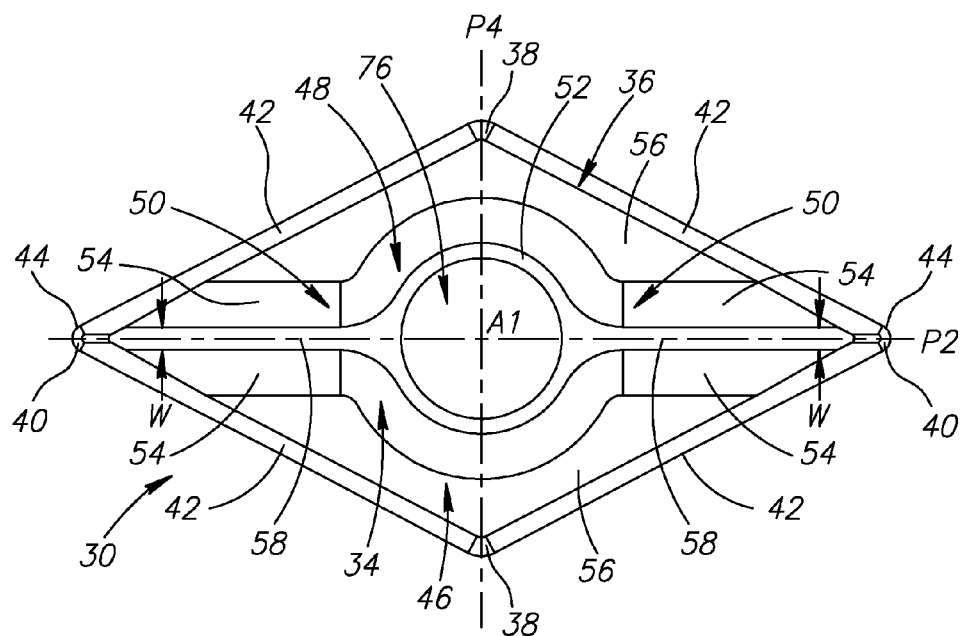
FIG. 3 is a bottom view of a cutting insert in accordance with some embodiments of the present invention.
Figure 4:
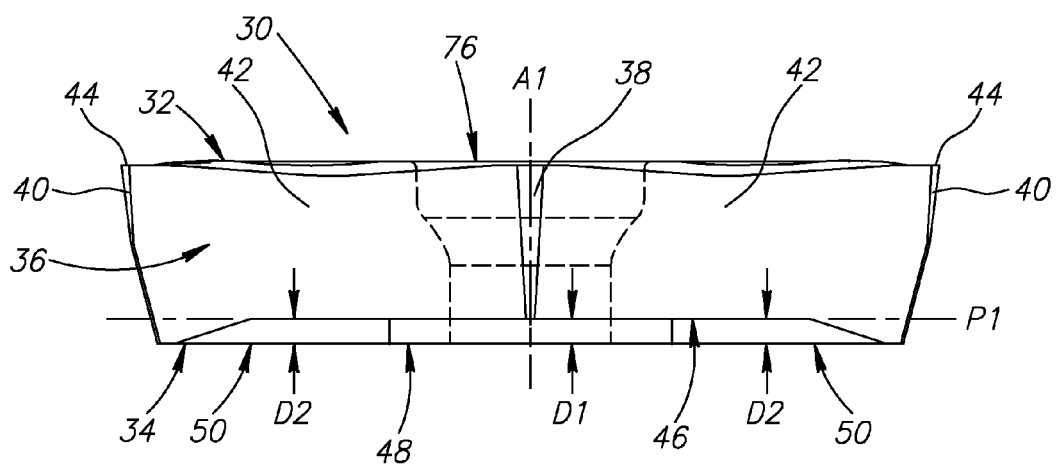
FIG. 4 is a side view of the cutting insert shown in FIG. 3.

According to the present invention, as shown in FIGS. 3 and 4, the cutting insert 30 has opposing rhombus-shaped upper and lower surfaces 32, 34 and a peripheral side surface 36 therebetween, the peripheral side surface 36 having alternating obtuse and acute corner surfaces 38, 40 separated by four relief surfaces 42.

A nose cutting edge 44 is formed at the intersection of the upper surface 32 with each of the two acute corner surfaces 40.

In some embodiments of the present invention, the cutting insert 30 may be described as 'positive', with the four relief surfaces 42 inclined inwardly in a direction away from the upper surface 32.

Also, in some embodiments of the present invention, the four relief surfaces 42 may be planar.

According to the present invention, as shown in FIGS. 3 and 4, the lower surface 34 includes a base surface 46, a central axis A1 passes through the upper and lower surfaces 32, 34, and the cutting insert 30 is indexable about the central axis A1.

In some embodiments of the present invention, as shown in FIG. 4, the base surface 46 may define a base plane P1, and the central axis A1 may be perpendicular to the base plane P1.

Also, in some embodiments of the present invention, as shown in FIG. 3, the cutting insert 30 may exhibit two-fold rotational symmetry about the central axis A1.

Further, in some embodiments of the present invention, as shown in FIG. 3, a longitudinal plane P2 extending along the long dimension of the rhombus-shaped upper and lower surfaces 32, 34 may contain the central axis A1 and bisect the two acute corner surfaces 40 and the two nose cutting edges 44. The cutting insert 30 may exhibit mirror symmetry about the longitudinal plane P2.

As also seen in FIG. 3, a transverse plane P4 extending along the short dimension of the rhombus-shaped upper and lower surfaces may also contain the central axis A1 and bisect the two obtuse corner surfaces 38. Thus, the longitudinal plane P2 and the transverse plane P4 may be perpendicular to each other and intersect at the central axis A1. The cutting insert 30 may exhibit mirror symmetry about the transverse plane P4 in addition to the plane P2.

According to the present invention, as shown in FIGS. 3 and 4, exactly two engagement ridges 50 protrude from the base surface 46, each engagement ridge 50 including a pair of parallelly extending ridge flank surfaces 54 forming a V-shaped cross-section. Each engagement ridge 50 extends along the longitudinal plane P2.

Figure 8:
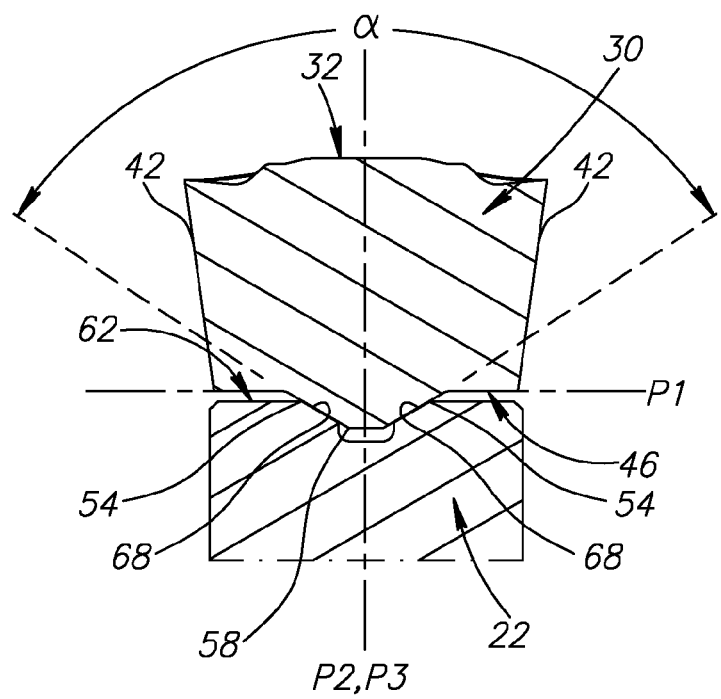
FIG. 8 is a cut view of the cutting tool shown in FIG. 7 taken along the line VIII-VIII.
Figure 10:
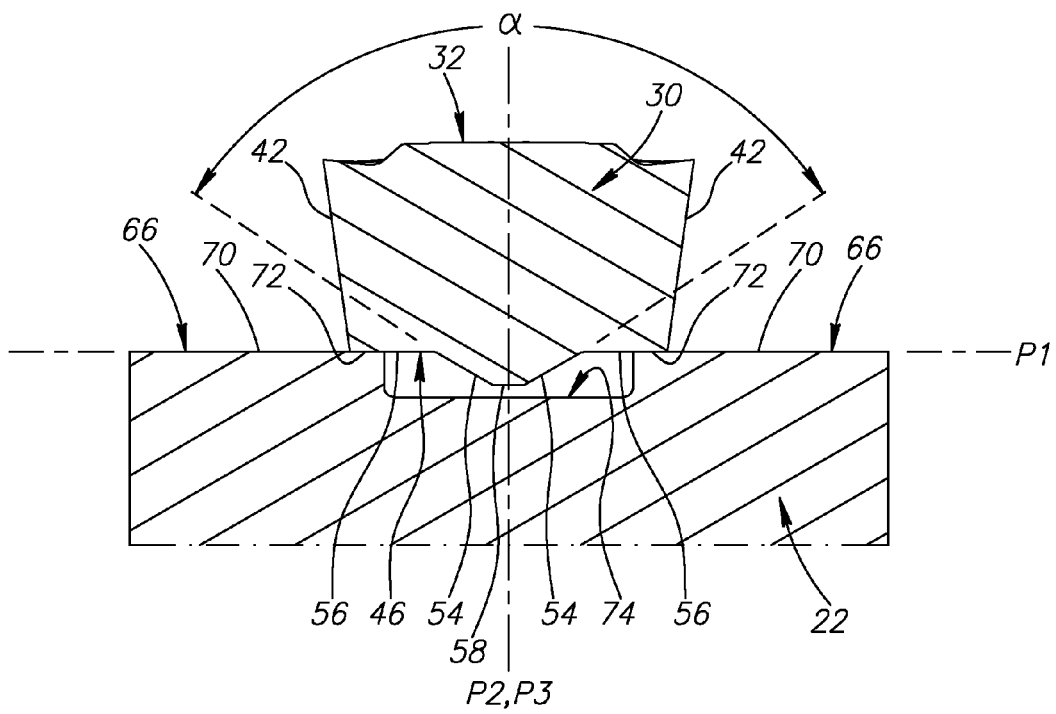
FIG. 10 is a cut view of the cutting tool shown in FIG. 7 taken along the line X-X.

In some embodiments of the present invention, as shown in FIGS. 8 and 10, the pair of ridge flank surfaces 54 of each engagement ridge 50 may form an obtuse engagement angle $\alpha$. The engagement angle $\alpha$ has a preferable range of 90°-150°.

In other embodiments of the present invention (not shown), the two surface components of the pair of ridge flank surfaces 54 of each engagement ridge 50 may be outwardly convex.

According to the present invention, as shown in FIGS. 3 and 4, each engagement ridge 50 intersects one of the acute corner surface 40 and extends therefrom towards the central axis A1.

In some embodiments of the present invention, as shown in FIGS. 3 and 4, a central boss 48 may protrude from the base surface 46, the central boss 48 may have a raised boss end surface 52, and each engagement ridge 50 may intersects the central boss 48, thereby dividing the base surface 46 into at least two separate base sub-surfaces 56 which do not communicate with each other.

It should be appreciated that the two acute corner surfaces 40 represent the two furthest spaced apart corner surfaces, and the two engagement ridges 50 merge with the central boss 48 to form a single structural member extending between these two furthest spaced apart corner surfaces 40. This single structural member improves the rigidity of the cutting insert 30, such that deformations and inaccuracies resulting from the sintering process of the cutting insert 30 are reduced to a minimum.

In some embodiments of the present invention, as shown in FIG. 3, the base surface 46 may have exactly two identical base sub-surfaces 56.

Also, in some embodiments of the present invention, as shown in FIG. 4, the central boss 48 may protrude a first distance D1 from the base plane P1 and the two engagement ridges 50 may each protrude a second distance D2 from the base plane P1, where D1 is equal to D2.

It should be appreciated that use of the term "V-shaped" throughout the description and claims, is not restricted to a pair of flank surfaces forming a 'V' shape and intersecting at a vertex point (when viewed in cross-section), but also accounts for an additional surface spacing the pair of flank surfaces apart.

In some embodiments of the present invention, as shown in FIGS. 3 and 4, each engagement ridge 50 may include an intermediate surface 58 spacing its respective pair of ridge flank surfaces 54 apart, and the boss end surface 52 of the central boss 48 and the two intermediate surfaces 58 may be coplanar and continuous. Thus, the term "V-shaped" applies to each engagement ridge 50 having such an intermediate surface 58 spacing apart its respective pair of ridge flank surfaces 54.

Further, in some embodiments of the present invention, as shown in FIG. 3, each intermediate surface 58 may have an intermediate width W, where W is greater than half of D2 and less than D2.

It should be appreciated that the intermediate width W being greater than half the second distance D2 provides each engagement ridge 50 with an advantageously compact and robust profile.

It should also be appreciated that the intermediate width W being less than the second distance D2 causes each pair of ridge flank surfaces 54 to extend to within close proximity of its respective acute corner surface 40, thus providing good support for its associated nose cutting edge 44 when operative.

Figure 5:
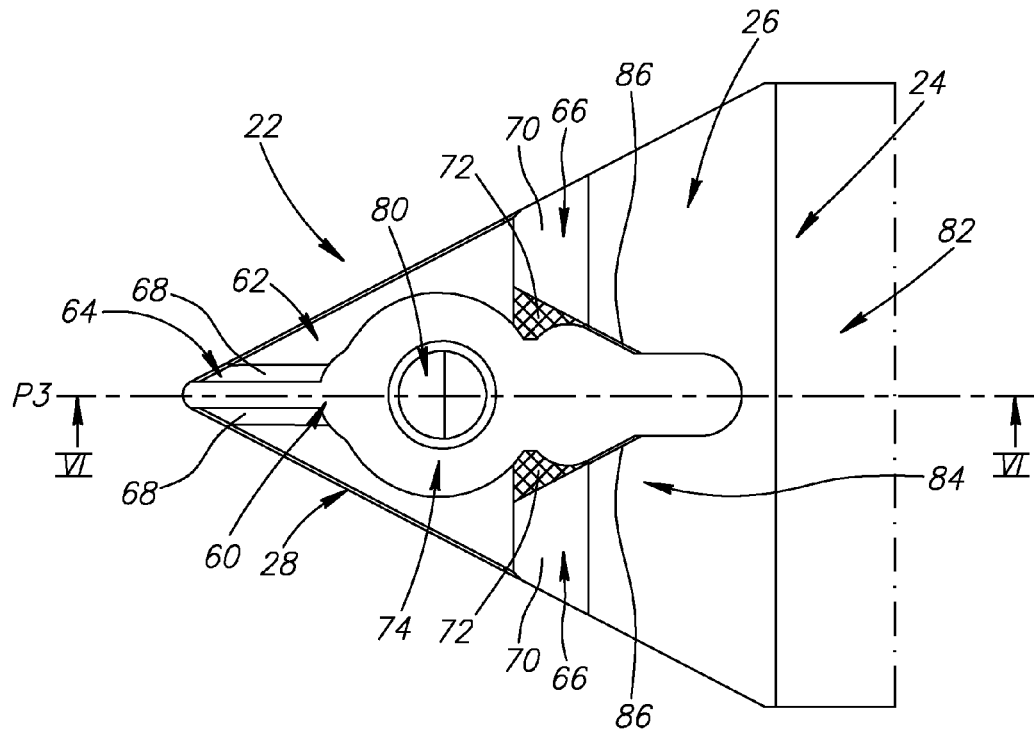
FIG. 5 is a top view of a tool holder in accordance with some embodiments of the present invention.
Figure 6:
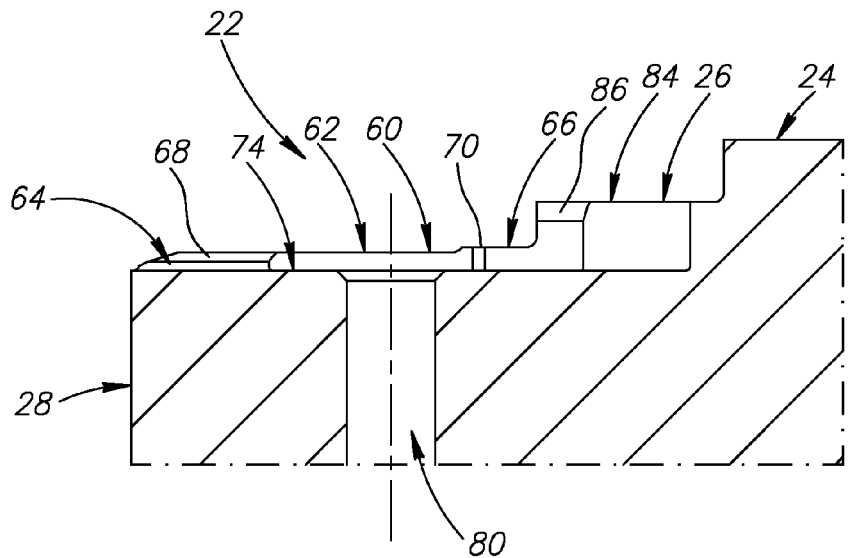
FIG. 6 is a cross-sectional view of the tool holder shown in FIG. 5, taken along the line VI-VI.

According to the present invention, as shown in FIGS. 5 and 6, the insert receiving pocket 26 includes a seating surface 60, the seating surface 60 having a floor surface 62 with a single engagement groove 64 recessed therein and two separate support steps 66 protruding therefrom.

The engagement groove 64 includes a pair of parallelly extending groove flank surfaces 68 forming a V-shaped cross-section, and each of the two support steps 66 has a raised support surface 70.

As shown in FIG. 8, the V-shaped cross-section of the pair of groove flank surfaces 68 corresponds with the V-shaped cross-section of the ridge flank surfaces 54 of the engagement ridge 50 located closest to the operative nose cutting edge 44. However, the intermediate surface 58 of the engagement ridge 50 located closest to the operative nose cutting edge 44 does not abut any surface of the engagement groove 64.

The two support surfaces 70 are coplanar and entirely located rearward of the engagement groove 64.

It should be appreciated that use of the term "rearward" and "rearwardly" throughout the description and claims, refers to a direction from the tool holder's front end 28 towards the tool holder's main body 24. This direction is towards the right, in FIGS. 5 and 7.

It should also be appreciated that the seating surface 60 being configured with the single engagement groove 64 and the two coplanar support surfaces 70, as opposed to an alternative configuration with more than one engagement groove or ridge, enables the insert receiving pocket 26 to be manufactured with greater efficiency.

In some embodiments of the present invention, as shown in FIG. 5, a pocket bisector plane P3 may longitudinally bisect the engagement groove 64, and the seating surface 60 may exhibit mirror symmetry about the pocket bisector plane P3.

Also, in some embodiments of the present invention, as shown in FIG. 5, the pair of groove flank surfaces 68 may be entirely located closer to the pocket bisector plane P3 than are the two support surfaces 70.

According to the present invention, as shown in FIGS. 7 to 10, the lower surface 34 of the cutting insert 30 is clamped against the seating surface 60 of the insert receiving pocket 26 solely by:

the pair of ridge flank surfaces 54 of the engagement ridge 50 located closest to the operative nose cutting edge 44 making contact with the pair of groove flank surfaces 68 in the single engagement groove 64; and the base surface 46 making contact with the two raised support surfaces 70 at two bearing zones 72 entirely located closer to the non-operative nose cutting edge 44 than to the operative nose cutting edge 44.

In some embodiments of the present invention, as shown in FIG. 2, the two bearing zones 72 may be located on two base sub-surfaces 56.

Also, in some embodiments of the present invention, as shown in FIGS. 5 and 6, the floor surface 62 may include a central recess 74.

Figure 9:
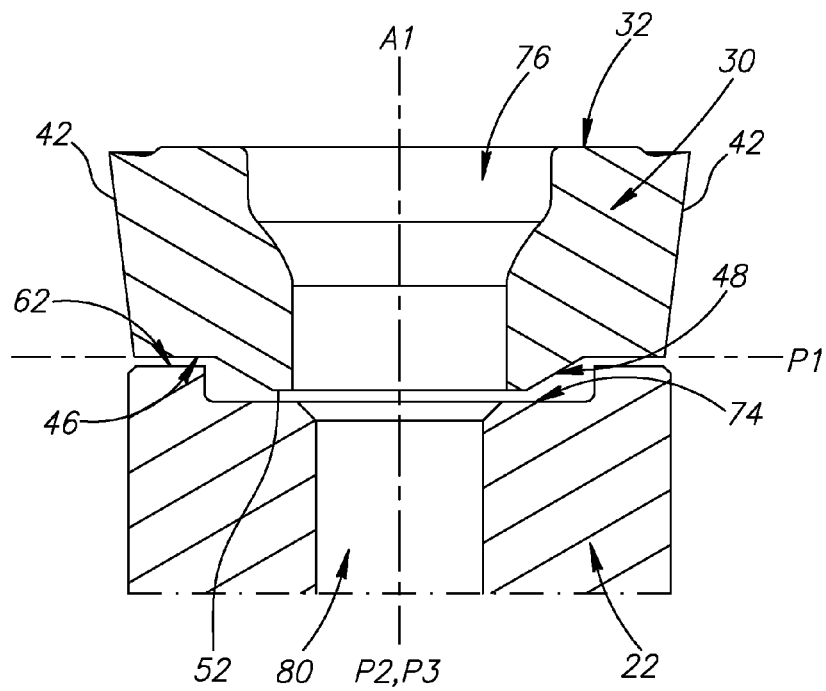
FIG. 9 is a cut view of the cutting tool shown in FIG. 7 taken along the line IX-IX.

As shown in FIG. 9, the central recess 74 may provide clearance between the central boss 48 and the insert receiving pocket 26, and as shown in FIG. 10, the central recess 74 may provide clearance between the non-operative engagement ridge 50 and the insert receiving pocket 26.

Also, in some embodiments of the present invention, as shown in FIGS. 2 and 10, each of the two bearing zones 72 of the cutting insert 30 may be delimited by a different one of the two relief surfaces 42 closest to the non-operative nose cutting edge 44.

It should be appreciated that the lower surface 34 of the cutting insert 30 is effectively clamped against the seating surface 60 of the insert receiving pocket 26 at three corner points of an imaginary triangle, where the central axis A1 intersects the imaginary triangle at a substantially central location to define an optimal point through which a clamping force can be applied, to achieve a high level of clamping stability.

Also, by virtue of the ridge flank surfaces 54 associated with the two engagement ridges 50 and the groove flank surfaces 68 associated with the single engagement groove 64 having V-shaped cross-sections, the cutting insert 30 has a high level of resistance to transverse cutting forces in each index position.

In some embodiments of the present invention, as shown in FIGS. 3 and 4, a through bore 76 may extend coaxially with the central axis A1 and open out to both the upper surface 32 and the boss end surface 52 of the cutting insert 30.

Also, in some embodiments of the present invention, as shown in FIGS. 1 and 2, a clamping screw 78 may be located in the through bore 76 and threadingly engaged in a threaded bore 80 in the seating surface 60 to apply the clamping force.

In other embodiments of the present invention (not shown), the through bore 76 may only open out to the upper surface 32, and an alternative clamping member may engage the through bore 76 to apply the clamping force.

It should be appreciated that in addition to the benefits already described above, the improved rigidity of the cutting insert 30, provided by the single structural member formed by the two engagement ridges 50 merging with the central boss 48, also advantageously reduces the susceptibility of the cutting insert 30 to fracture or deformation during clamping and cutting operations.

In some embodiments of the present invention, as shown in FIGS. 5 and 6, the insert receiving pocket 26 may include an abutment shoulder 84 rearward of the seating surface 60 having exactly two abutment walls 86 entirely located further from the floor surface 62 than the two support surfaces 70. As shown in FIG. 5, in a top view of the tool holder 22, the two abutment walls 86 may diverge in a forward direction.

It should be appreciated that use of the term "forward" throughout the description and claims, refers to a direction opposite to the rearward direction. The forward direction is towards the left, in FIGS. 5 and 7.

Figure 7:
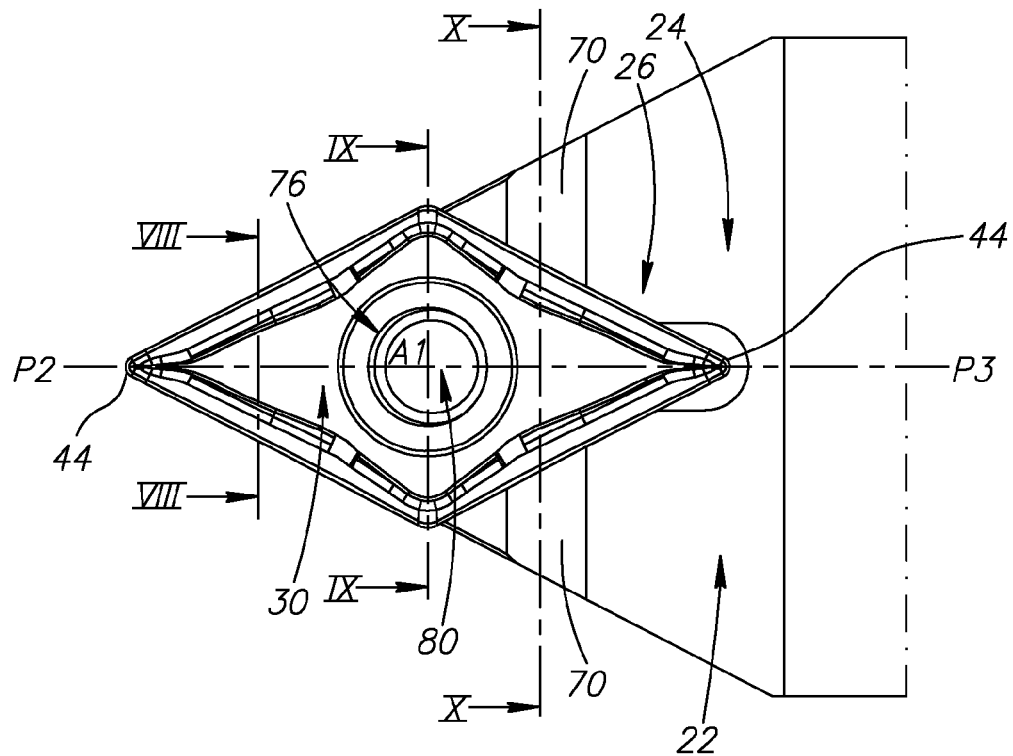
FIG. 7 is a top view of the cutting tool shown in FIG. 1, with a clamping screw removed.

Also, in some embodiments of the present invention, as in FIG. 7, the through bore 76 and the threaded bore 80 may be eccentric to each other, such that a component of the clamping force can be directed rearwardly.

As shown in FIGS. 1, 2 and 7, whilst the lower surface 34 of the cutting insert 30 is clamped against the seating surface 60 of the insert receiving pocket 26, the peripheral side surface 36 of the cutting insert 30 may be simultaneously clamped against the abutment shoulder 84 of the insert receiving pocket 26 solely by:

each of the two relief surfaces 42 closest to the non-operative nose cutting edge 44 making contact with a different one of the two abutment walls 86.

Further, in some embodiments of the present invention, as shown in FIG. 7, the longitudinal and pocket bisector planes P2, P3 may be coplanar.

What is claimed is:

1. A single-sided indexable cutting insert (30) comprising:
    opposing rhombus-shaped upper and lower surfaces (32, 34) and a peripheral side surface (36) therebetween, the peripheral side surface (36) having alternating obtuse and acute corner surfaces (38, 40) separated by four relief surfaces (42), the two acute corner surfaces (40) representing the two furthest spaced apart corner surfaces;
    a central axis (A1) passing through the upper and lower surfaces (32, 34), about which central axis the cutting insert (30) is indexable; and
    a nose cutting edge (44) formed at the intersection of the upper surface (32) with each of the two acute corner surfaces (40),
    the lower surface (34) comprising:
    a base surface (46); and
    a central boss (48) and exactly two engagement ridges (50) protruding from the base surface (46), the central boss (48) having a raised boss end surface (52), and each engagement ridge (50) including a pair of parallelly extending ridge flank surfaces (54) forming a V-shaped cross-section,
    wherein each engagement ridge (50) intersects one of the acute corner surface (40) and extends therefrom towards the central axis (A1) to intersect the central boss (48), and the base surface (46) is divided into at least two separate base sub-surfaces (56).

2. The cutting insert (30) according to claim 1, wherein the pair of ridge flank surfaces (54) of each engagement ridge (50) form an obtuse engagement angle (α).

3. The cutting insert (20) according to claim 1, wherein:
    the base surface (46) defines a base plane (P1);
    the central boss (48) protrudes a first distance D1 from the base plane (P1) and the two engagement ridges (50) each protrude a second distance D2 from the base plane (P1); and
    wherein D1 is equal to D2.

4. The cutting insert (30) according to claim 3, wherein each engagement ridge (50) includes an intermediate surface (58) spacing its respective pair of ridge flank surfaces (54) apart, and
    wherein the boss end surface (52) and the two intermediate surfaces (58) are coplanar and continuous.

5. The cutting insert (30) according to claim 4, wherein each intermediate surface (58) has an intermediate width W, and
    wherein W is greater than half of D2 and less than D2.

6. The cutting insert (30) according to claim 1, wherein the cutting insert (30) exhibits two-fold rotational symmetry about the central axis (A1).

7. The cutting insert (30) according to claim 1, wherein a longitudinal plane (P2) contains the central axis (A1) and bisects the two nose cutting edges (44), and
    wherein the cutting insert (30) exhibits mirror symmetry about the longitudinal plane (P2).

8. The cutting insert (30) according to claim 1, wherein a through bore (76) extends coaxially with the central axis (A1) and opens out to both the upper surface (32) and the boss end surface (52).

9. The cutting insert (30) according to claim 1, wherein the base surface (46) comprises exactly two identical base sub-surfaces (56).

10. A tool holder (22) comprising:
    a main body (24) with an insert receiving pocket (26) at a front end (28) thereof, the insert receiving pocket (26) including a seating surface (60), and the seating surface (60) having a floor surface (62) with a single engagement groove (64) recessed therein and exactly two separate support steps (66) protruding therefrom,
    the engagement groove (64) including a pair of parallelly extending groove flank surfaces (68) forming a V-shaped cross-section; and
    each of the two support steps (66) having a raised support surface (70),
    wherein the two support surfaces (70) are coplanar and entirely located rearward of the engagement groove (64).

11. The tool holder (22) according to claim 10, wherein the insert receiving pocket (26) includes an abutment shoulder (84) rearward of the seating surface (60) having exactly two abutment walls (86) entirely located further from the floor surface (62) than the two support surfaces (70), and
    wherein in a top view of the tool holder (22), the two abutment walls (86) diverge in a forward direction.

12. The tool holder (22) according to claim 10, wherein the insert receiving pocket (26) is configured to removably secure a single-sided indexable cutting insert (30).

13. The tool holder (22) according to claim 10, wherein a pocket bisector plane (P3) longitudinally bisects the engagement groove (64), and
    wherein the seating surface (60) exhibits mirror symmetry about the pocket bisector plane (P3).

14. The tool holder (22) according to claim 13, wherein the pair of parallelly extending groove flank surfaces (68) are entirely located closer to the pocket bisector plane (P3) than are the two support surfaces (70).

15. A cutting tool (20) comprising a tool holder (22) having a main body (24) with an insert receiving pocket (26) formed in a front end (28) thereof, and a cutting insert (30) removably secured in the insert receiving pocket (26);
    the insert receiving pocket (26) comprising:
    a seating surface (60) having a floor surface (62) with a single engagement groove (64) recessed therein and two separate support steps (66) protruding therefrom;
    the engagement groove (64) including a pair of parallelly extending groove flank surfaces (68) forming a V-shaped cross-section, and each of the two support steps (66) having a raised support surface (70),
    wherein the two support surfaces (70) are coplanar, and
    the cutting insert (30) comprising:
    opposing rhombus-shaped upper and lower surfaces (32, 34) and a peripheral side surface (36) therebetween, the peripheral side surface (36) having alternating obtuse and acute corner surfaces (38, 40) separated by four relief surfaces (42);
    a central axis (A1) passing through the upper and lower surfaces (32, 34), about which central axis the cutting insert (30) is indexable; and
    a nose cutting edge (44) formed at the intersection of the upper surface (32) with each of the two acute corner surfaces (40), the lower surface (34) including a base surface (46) and having exactly two engagement ridges (50) protruding from the base surface (46), wherein each engagement ridge (50) includes a pair of parallelly extending ridge flank surfaces (54) forming a V-shaped cross-section, and each engagement ridge (50) intersects one of the acute corner surface (40) and extends therefrom towards the central axis (A1), wherein the lower surface (34) of the cutting insert (30) is clamped against the seating surface (60) of the insert receiving pocket (26) solely by:

the pair of ridge flank surfaces (54) of the engagement ridge (50) located closest to the operative nose cutting edge (44) making contact with the corresponding pair of groove flank surfaces (68) in the single engagement groove (64); and the base surface (46) making contact with the two raised support surfaces (70) at two bearing zones (72) entirely located closer to the non-operative nose cutting edge (44) than to the operative nose cutting edge (44).

16. The cutting tool (20) according to claim 15, wherein a central boss (48) having a raised boss end surface (52) protrudes from the base surface (46), and each engagement ridge (50) intersects the central boss (48), and wherein the base surface (46) is divided into at least two separate base sub-surfaces (56), and the two bearing zones (72) are located on two of the at least two base sub-surfaces (56).

17. The cutting tool (20) according to claim 15, wherein the insert receiving pocket (26) includes an abutment shoulder (84) rearward of the seating surface (60) having exactly two abutment walls (86), and wherein the peripheral side surface (36) of the cutting insert (30) is clamped against the abutment shoulder (84) of the insert receiving pocket (26) solely by:

each of the two relief surfaces (42) closest to the non-operative nose cutting edge (44) making contact with a different one of the two abutment walls (86).

18. The cutting tool (20) according to claim 16, wherein:
the base surface (46) defines a base plane (P1);
the central boss (48) protrudes a first distance D1 from the base plane (P1) and the two engagement ridges (50) each protrude a second distance D2 from the base plane (P1); and
wherein D1 is equal to D2.

19. The cutting tool (20) according to claim 16, wherein the floor surface (62) has a central recess (74), and wherein the central recess (74) provides clearance between the central boss (48) and the insert receiving pocket (26).

20. The cutting tool (20) according to claim 16, wherein:

each engagement ridge (50) includes an intermediate surface (58) spacing its respective pair of ridge flank surfaces (54) apart;

the boss end surface (52) and the two intermediate surfaces (58) are coplanar and continuous; and wherein the intermediate surface (58) of the engagement ridge (50) located closest to the operative nose cutting edge (44) does not abut any surface of the engagement groove (64).

21. The cutting tool (20) according to claim 15 wherein the cutting insert (30) exhibits two-fold rotational symmetry about the central axis (A1).

22. The cutting tool (20) according to claim 15, wherein the two bearing zones (72) are each delimited by a different one of the two relief surfaces (42) closest to the non-operative nose cutting edge (44).

23. The cutting tool (20) according to claim 16, wherein a through bore (76) extends coaxially with the central axis (A1) and opens out to both the upper surface (32) and the boss end surface (52).

24. The cutting tool (20) according to claim 23, wherein a clamping screw (78) located in the through bore (76) is threadingly engaged in a threaded bore (80) in the seating surface (60).

25. The cutting tool (20) according to claim 24, wherein the through bore (76) and the threaded bore (80) are eccentric to each other.

26. The cutting insert (30) according to claim 1, wherein a longitudinal plane (P2) extends along a long-dimension of the rhombus-shaped upper and lower surfaces (32, 34), contains the central axis (A1) and bisects the two acute corner surfaces (40), and wherein each engagement ridge (50) extends along the longitudinal plane (P2).

* * * * *